US005164202A

United States Patent [19]

Beyer et al.

[11] Patent Number: 5,164,202

[45] Date of Patent: Nov. 17, 1992

[54] CONTROL DEVICE FOR THE TIMED CONTROL OF THE FILLING PRESSURE DURING THE FILLING OF A PRESS DIE

[75] Inventors: Lutz Beyer, Haltern; Peter Kluge, Herne, both of Fed. Rep. of Germany

[73] Assignee: Robert Bosch GmbH, Stuttgart, Fed. Rep. of Germany

[21] Appl. No.: 687,919

[22] PCT Filed: Dec. 14, 1989

[86] PCT No.: PCT/DE89/00770

§ 371 Date: May 31, 1991

§ 102(e) Date: May 31, 1991

[87] PCT Pub. No.: WO90/07406

PCT Pub. Date: Jul. 12, 1990

[30] Foreign Application Priority Data

Dec. 30, 1988 [DE] Fed. Rep. of Germany ....... 3844334

[51] Int. Cl.[5] ....................... B29C 43/58; B29C 45/77

[52] U.S. Cl. ................................ 425/146; 264/40.15; 425/149; 425/157; 425/159; 425/166

[58] Field of Search ............... 425/145, 146, 157, 159, 425/166, 149; 264/40.3, 40.1

[56] References Cited

U.S. PATENT DOCUMENTS

| | | | |
|---|---|---|---|
| 3,642,404 | 2/1972 | Nagawa | 425/145 |
| 3,767,339 | 10/1973 | Hunkar | 425/149 |
| 3,859,400 | 1/1975 | Ma | 425/145 |
| 4,060,362 | 11/1977 | Wilson, III | 425/145 |
| 4,120,631 | 10/1978 | Leutner et al. | 425/145 |
| 4,207,047 | 6/1980 | Kolb et al. | 425/146 |
| 4,411,609 | 10/1983 | Yoshii et al. | 425/149 |

FOREIGN PATENT DOCUMENTS

| | | |
|---|---|---|
| 1584543 | 3/1970 | Fed. Rep. of Germany . |
| 3143550 | 5/1983 | Fed. Rep. of Germany . |
| 3144678 | 5/1983 | Fed. Rep. of Germany . |
| 3347035 | 7/1985 | Fed. Rep. of Germany . |

*Primary Examiner*—Jay H. Woo
*Assistant Examiner*—Khanh P. Nguyen
*Attorney, Agent, or Firm*—Michael J. Striker

[57] ABSTRACT

A control device for timed control of a filling pressure during filling of a press die with a pasty or slip-like mass has a pressure sensor detecting a pressure in the press die, a threshold stage to which a corresponding pressure signal is fed from the pressure sensor, a timing element on which the threshold stage acts to maintain a filling pressure at an intended value during determinable holding time, a second threshold stage to which the pressure signal can be fed, and a logical gate to which outputs of the two threshold stages are connected and which generate a trigger signal for timing element when a particular value simultaneously exceeds a first threshold value of the first threshold stage and falls below a second threshold value of the second threshold stage.

8 Claims, 2 Drawing Sheets

CONTROL DEVICE FOR THE TIMED CONTROL OF THE FILLING PRESSURE DURING THE FILLING OF A PRESS DIE

BACKGROUND OF THE INVENTION

The present invention relates to a control device for the timed control of the filling pressure during the filling of a press die with a pasty or slip-like mass, especially for the production of oxide magnets, according to the pre-characterizing clause of the main claim.

To ensure fault-free manufacture, an important aim of production operations of this type is to keep the press thickness and press density of the magnet blanks within narrow tolerance limits, whilst at the same time as rapid a production cycle as possible should be sought after. For this, after the maximum filling pressure has been reached, it is necessary to maintain this for a set predeterminable time. If this time is too short, there is the danger that the production quality will be diminished, and if it is too long there is a needless lengthening of the filling operation.

A control device of the above mentioned generic type is known from German Offenlegungsschrift 3,347,035. The aim of this, when the maximum filling pressure is reached, is to cut in a timing element which maintains the filling pressure during its holding time. This is achieved because, when a desired pressure value is reached during this holding time, the filling pressure is regulated to the desired value. However, a hydraulic regulating device involving a high outlay is required for this purpose. In contrast, if a regulating device were omitted and the pump pressure predetermined as the maximum filling pressure, the triggering of the holding time as a result of a desired-value comparison is too unreliable, since the desired value for the maximum filling pressure is possibly not reached as a result of pressure fluctuations. In order nevertheless to conduct a filling operation without a pressure-regulating circuit, a holding time is therefore predetermined for the entire filling pressure via a timing element in a likewise known way. But the disadvantage of this is that the flow time and filling-pressure holding time are added to the total holding time, and therefore in the event of a lengthening of the flow-pressure time as a result of fluctuations in the flow conditions and in the consistency of the flowing mass the filling-pressure holding time could be reduced in an inadmissible way. The opposite situation, namely a lengthening of the filling-pressure holding time as a result of a reduction of the flow time, once again leads to a needless lengthening of the production cycle. Because of these fluctuations, it is also necessary to equip the total holding time with a safety reserve, thus once more leading to a needless lengthening of the production cycle.

SUMMARY OF THE INVENTION

Accordingly, it is an object of the present invention to provide a control device for the timed control of the filling pressure during the filling of the press due, which avoids the disadvantages of the prior art.

In keeping with these objects and with other which will become apparent hereinafter, one feature of the present invention resides, briefly stated in a control device for the timed control of the filling pressure during the filling of the press die with a pasty or slip-disc mass, especially for the production of oxide magnets, with a pressure sensor detecting the pressure in the press die and feeding a corresponding pressure signal to a threshold stage, the threshold stage acting on a timing element maintaining the filling pressure at an intended value during a determinable holding time, wherein in accordance with the invention, the pressure signal can be fed to a second threshold stage via a differentiating element and the outputs of the two threshold stages are connected to a logical gate which generates a trigger signal for the timing element when the particular value simultaneously exceeds a first threshold value of the first threshold stage and falls below a second threshold value of the second threshold stage.

The advantage of the control device according to the invention, is that the filling-pressure holding time can be adhered to with great accuracy, the filling pressure itself being predeterminable by means of the maximum pump pressure, so that it is possible to do without a hydraulic regulating device involving a high outlay. Because the filling-pressure holding time can be set exactly, it can be minimized, and the press cycle time can therefore also be reduced. Changes in the mass viscosity of the flowing mass, flow resistances and pump wear have no influence on the holding time of the maximum filling pressure. This results not only in a reduction of the filling-pressure holding time to be set, but also in a reduction in the reject rate because filling errors are avoided.

To measure the pressure during the pressing operation, a piezoelectric or strain-gauge probe is preferably used, preferably at the mould entrance. These probes, together with a following voltage amplifier, produce an electrical signal trend which is strictly proportional to the pressure trend. Where a piezoelectric probe is concerned, the voltage amplifier is designed as an integrating amplifier element, whilst in the other instance integrating properties are not needed.

Since the first threshold value can be selected between the flow pressure and the filling pressure, it is possible for it also to be fixed relatively far below the filling pressure, so that a reliable triggering of the timing element is always possible. This triggering nevertheless then occurs exactly when the filling pressure is reached. The second threshold value too needs not be fixed exactly and is merely selected lower than the differential time quotient of the pressure rises between the flow pressure and filling pressure. Thus, a very exact detection of the reaching of the maximum filling pressure is obtained, without the two relevant threshold values themselves needing to be exact.

BRIEF DESCRIPTION OF THE DRAWING

An exemplary embodiment of the invention is illustrated in the drawing and explained in more detail in the following description. In the drawing.

DESCRIPTION OF THE PREFERRED EMBODIMENT

Figure 1:
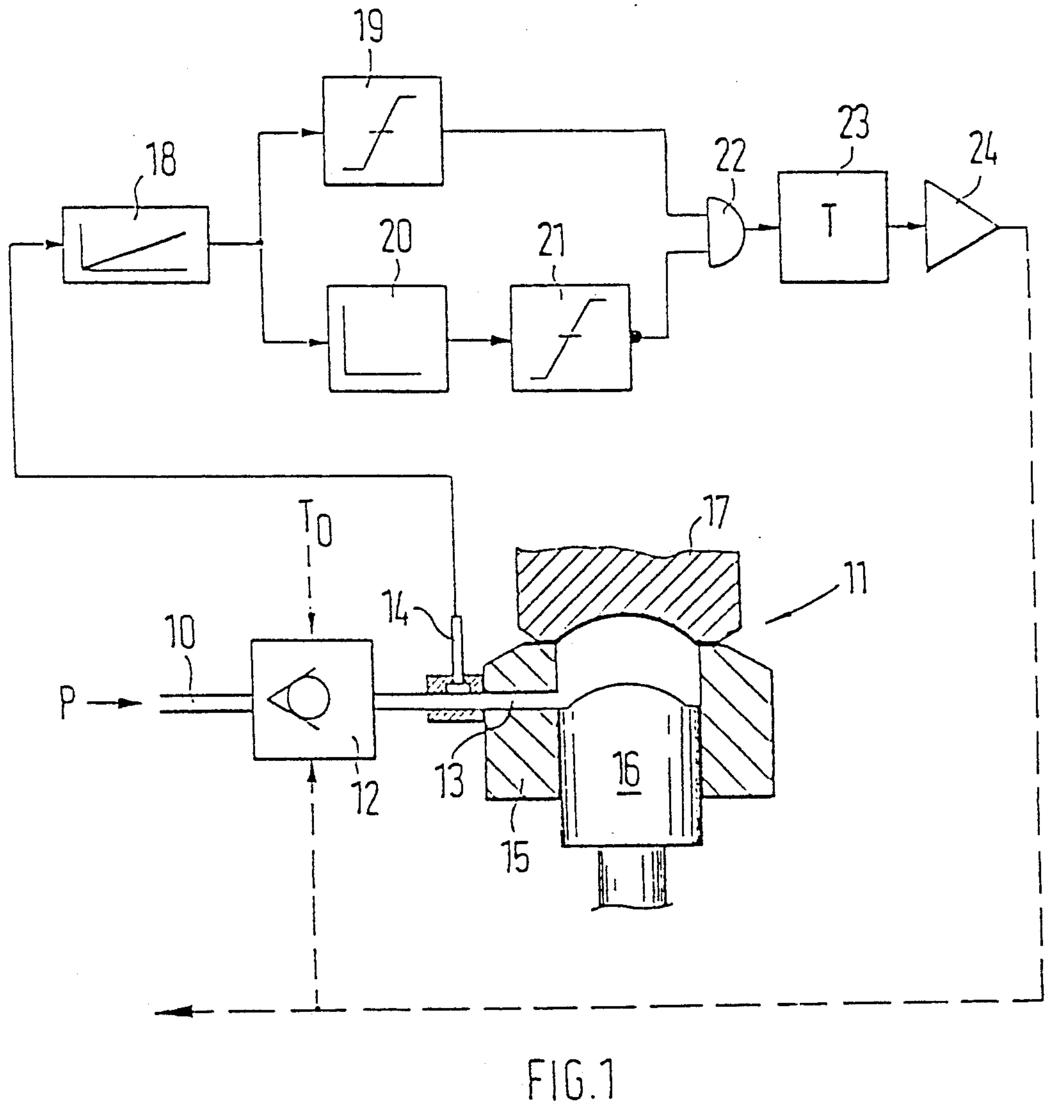
FIG. 1 shows a block diagram as an exemplary embodiment of the control device.

To produce an oxide magnet or the like, an appropriately composed pasty or slip-like mass is fed to a press die 11 via a filling line 10 from a mass pump (not shown). This is carried out via a mass shutoff valve 12 which is located in the filling line 10 and from which a mass filling channel 13 equipped with a pressure sensor 14 leads to the press die 11. The die has an essentially cylindrical mould 15 which is closed at one end by a bottom ram 16 moveable in the manner of a piston and at the other end by a top ram 17. Between this is formed the press space defining the shape of the product to be produced. The mass filling channel 13 extends radially through the mould 15, but can of course also be guided through another wall limitation of the press space.

The signal from the pressure sensor 14 is fed to an amplifier element 18 which, if the pressure sensor 14 takes the form of a piezoelectric probe, can be designed as an integrating amplifier element and, for example where a strain-gauge probe is concerned, as a simple voltage amplifier, a signal trend strictly proportional to the pressure trend in the press mass being obtained in either case. The output of the amplifier element 18 is connected both to the input of a first threshold stage 19 and to the input of a differentiating element 20, the output of which is connected to the input of a second threshold stage 21. A non-inverting output of a first threshold stage 19 and an inverting output of the second threshold stage 21 are interconnected via an AND gate 22, the output of which is connected to a timing element 23. This means that the AND gate 22 generates a 1-signal at its output when the particular value exceeds a threshold value $S_1$ of the first threshold stage 19 and falls below a second threshold value $S_2$ of the second threshold stage 21. Of course, as a function of the inversion or inversion of the outputs of the two threshold stages 19, 21 and of the trigger signal required for the timing element 23, the AND gate 22 can also be replaced by another logical gate which makes the same logical connection as a function of the necessary input and output signals.

Via the output of the timing element 23, the hydraulic circuit of the mass pump is controlled by way of an amplifier 24, that is to say the filling pressure is cut off after this time by means of a valve or the like. This could also be carried out, for example, by the mass shutoff valve 12. The pressed article can now be taken out, or there follows an additional compaction by means of the bottom ram 16, as described in more detail in the state of the art indicated in the introduction.

Figure 2:
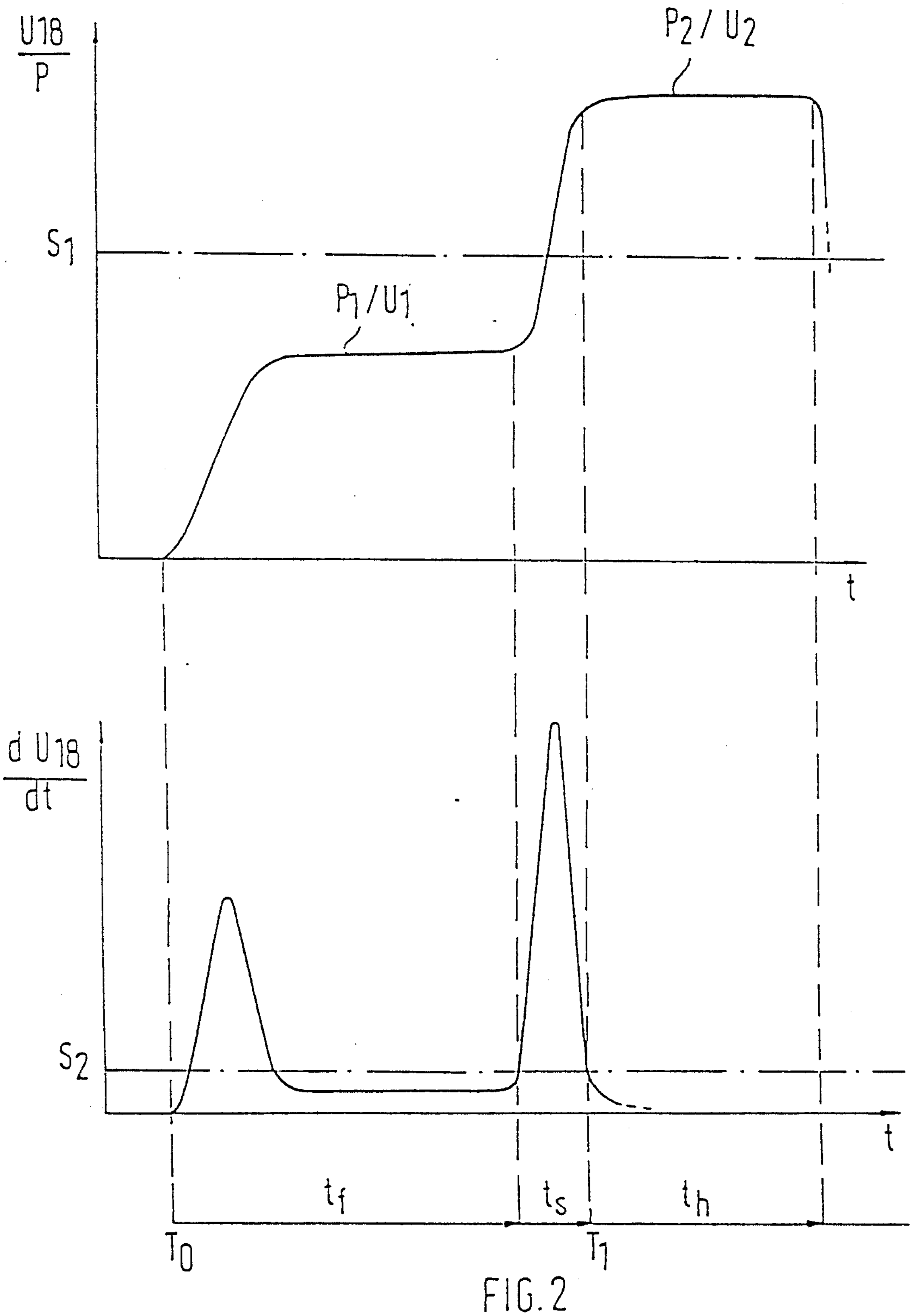
FIG. 2 shows a signal graph for explaining the mode of operation.

In order to fill the press die 11, the mass pump is cut in or the mass shutoff valve 12 opened at a moment $T_0$ according to FIG. 2. The mass thereby begins to flow into the press space via the mass filling channel 13. A pressure rise first takes place, until a stationary flow is obtained at a flow pressure $P_1$. A corresponding voltage $U_1$ is generated at the output of the amplifier element 18. The flow process takes place during the time $t_f$ and is concluded when the press space is filled completely with the mass to be introduced.

There is now a steep pressure rise during a filling-pressure rise time $t_s$, the mass being compacted in the press space, until the maximum filling pressure $P_2$ determined by the pump pressure is reached. There can no longer be any further pressure rise.

The lower graph of FIG. 2 represents the differential time quotient of the voltage corresponding to the pressure, according to the upper graph of FIG. 2. The two pressure-increase phases at the start of the flow time and at the end of the flow time thus generate high peaks in the lower graph. At the end of the filling-pressure rise time $t_s$, the differential quotient becomes very low and falls below the threshold value $S_2$. Thus, if the exceeding of the first threshold value $S_1$ located between the voltage levels $U_1$ and $U_2$ by the upper voltage trend and the falling below the threshold value $S_2$ by the differential quotient are connected logically by an AND operation by means of the AND gate 22, this produces a trigger signal for the timing element 23 at the moment $T_1$ which coincides exactly with the reaching of the filling pressure $P_2$. The timing element 23 has a holding time $t_h$ which corresponds to the optimized filling-pressure holding time and which can be up to 1 sec. During this time, the necessary compaction of the mass in the press die 11 takes place. After this holding time has elapsed, the product produced, for example an oxide magnet, is either taken out of the press die or is previously compacted additionally once again by means of the bottom ram 16.

Of course, the mass filling channel 13 can lead to a plurality of press dies which are filled jointly in one work cycle.

Schmitt triggers or comparators, one input of which receives the particular threshold value, can be used as threshold stages.

We claim:

1. A control device for timed control of a filling pressure during filling of a press die with a mass, comprising feeding means for feeding a mass to a press die; a pressure sensor detecting a pressure in the press die; a first threshold stage to which a corresponding pressure signal is fed from said pressure sensor; a timing element on which said threshold stage acts to maintain a filling pressure at an intended value during determinable holding time; a second threshold stage to which the pressure signal is fed; a differential element arranged so that the pressure signal is fed to said second threshold stage through said differentiating element; and a logical gate to which outputs of said two threshold stages are connected and which generates a trigger signal for said timing element when a particular value exceeds a first threshold value of said first threshold stage which first threshold value is located between a flow pressure and the filling pressure, and falls below a second threshold value of said second threshold stage which second threshold value is lower than a differential time quotient of a pressure rise between the flow pressure and the filling pressure, said logical gate having an output supplying said trigger signal to said timing element, and said timing element being connected with said feeding means so as to act on said feeding means.

2. A control device as defined in claim 1; and further comprising an amplifier element located after and connected with said pressure sensor.

3. A control device as defined in claim 1, wherein said pressure sensor is formed as a piezoelectric probe.

4. A control device as defined in claim 1, wherein said pressure sensor is formed as a strain-gauge probe.

5. A control device as defined in claim 2, wherein said pressure sensor is designed as a piezoelectric probe, said amplifier element connected with said pressure sensor is an integrated amplifier element.

6. A control device as defined in claim 1, wherein said feeding means includes a mass pump and further comprising and an amplifier element, said timing element acting on said mass pump via said amplifier element.

7. A control device as defined in claim 1, wherein said feeding means includes a mass pump, said mass pump having a hydraulic circuit and further comprising an amplifier element, said timing element acting on said hydraulic circuit of said mass pump via said amplifier element.

8. A control device as defined in claim 1, wherein said feeding means includes a filling line which leads to the press die and is provided with a valve, said timing element acting on said valve of said filling line.

* * * * *